United States Patent [19]

Emori et al.

[11] Patent Number: 4,877,100

[45] Date of Patent: Oct. 31, 1989

[54] HYDRAULIC REACTION FORCE APPARATUS FOR POWER STEERING SYSTEM

[75] Inventors: Yasuyoshi Emori; Hiroshi Ohsaki; Ikuo Nomura, all of Higashimatsuyama, Japan

[73] Assignee: Jidosha Kiki Co., Ltd., Tokyo, Japan

[21] Appl. No.: 231,808

[22] Filed: Aug. 12, 1988

[30] Foreign Application Priority Data

| Sep. 16, 1987 | [JP] | Japan | 62-139995[U] |
| Sep. 16, 1987 | [JP] | Japan | 62-139996[U] |
| Sep. 16, 1987 | [JP] | Japan | 62-139997 |
| Sep. 30, 1987 | [JP] | Japan | 62-150198[U] |
| Sep. 30, 1987 | [JP] | Japan | 62-150199[U] |

[51] Int. Cl.$^4$ ............................................. B62D 5/083
[52] U.S. Cl. ....................... 180/143; 91/375 A; 180/149
[58] Field of Search ............... 180/143, 142, 141, 149, 180/79.1, 79, 148; 74/388 PS; 91/375 A

[56] References Cited

U.S. PATENT DOCUMENTS

| 4,034,825 | 7/1977 | Adams | 180/143 |
| 4,380,273 | 4/1983 | Walter | 180/132 |
| 4,653,339 | 3/1987 | Komatsu et al. | 74/422 |
| 4,790,401 | 12/1988 | Sonoda | 180/142 |
| 4,793,433 | 12/1988 | Emori et al. | 180/148 X |

FOREIGN PATENT DOCUMENTS

49-102092  9/1974  Japan.
59-230863 12/1984  Japan.

Primary Examiner—Mitchell J. Hill
Attorney, Agent, or Firm—Townsend & Townsend

[57] ABSTRACT

A hydraulic reaction force apparatus for a power steering system includes input and output shafts, a flange, balls, a reaction force receiving portion, a hydraulic reaction force chamber, and an annular reaction force piston. The input and output shafts are accommodated in a body. The flange is formed on one of the input and output shafts and has axial through guide holes. The balls are movably fitted in the guide holes, respectively. The reaction force receiving portion is formed on the other one of the input and output shafts to axially receive the balls. The hydraulic reaction force chamber is formed at a position opposite to the reaction force receiving portion with respect to the flange. The reaction force piston is movably and coaxially fitted on the output shaft with a clearance to urge the balls against the reaction force receiving portion so as to generate a restriction force corresponding to a reaction force oil pressure. The restriction force acts between the input and output shafts. Seal rings are disposed between the reaction force piston and the body and between the reaction force piston and the one of the input and ouput shafts.

9 Claims, 4 Drawing Sheets

HYDRAULIC REACTION FORCE APPARATUS FOR POWER STEERING SYSTEM

BACKGROUND OF THE INVENTION

The present invention relates to a hydraulic reaction force apparatus for obtaining an appropriate steering force corresponding to various vehicle travel conditions such as a vehicle speed and a steering angle in a power steering system.

A power steering system for reducing a steering wheel operation force (steering force) in a vehicle must be appropriately controlled in accordance with a steering force and a steering angle which are determined by a steering operation of a driver, and vehicle travel conditions such as a vehicle speed. During a stationary swing in a vehicle stop state, or during steering at a low vehicle speed, a large auxiliary steering force is output to reduce the load acting on the steering operation. However, during high-speed travel, when a large auxiliary steering force is generated, the steering force is excessively reduced to cause the driver to feel anxiety. This is undesirable to optimize the driving feeling. In order to solve this problem, an auxiliary steering force must be reduced, in turn, to increase the steering force of the driver. Then, an appropriate force is required to steer a steering wheel to assure stability of straight travel. This steering force control must be applied in the same manner as described above when the steering angle is increased.

In order to satisfy the above needs, various types of conventional hydraulic reaction force apparatuses are available wherein appropriate rigidity (i.e., a steering reaction force) is applied to the steering wheel by a reaction force oil pressure controlled in accordance with the various travel conditions of the vehicle, thereby controlling the steering forces during high- and low-speed travel of the vehicle. A typical hydraulic reaction force apparatus is described in Japanese patent Laid-Open No. 49-102092. In a rotary control valve for flow path selection of this apparatus, a reaction force arm extends on the input shaft side. A pair of reaction force plungers are arranged on the output shaft side so as to reciprocate from both sides of the rotational direction of the arm. A hydraulic reaction chamber is formed on the outer end side of the plungers. A reaction force oil pressure is supplied to the hydraulic reaction chamber in accordance with the vehicle speed and the like to drive the plungers. A predetermined restriction force acts on the input shaft through the arm, thereby obtaining an appropriate steering reaction force and hence realizing steering corresponding to the vehicle travel conditions.

In the conventional structure described above, however, the reaction force plungers must be disposed at portions away from the axis of the output shaft but inside the output shaft. Therefore, the radial size of the reaction force apparatus is inevitably increased. This problem typically occurs when the pressure-receiving area of the plunger is increased to increase the hydraulic reaction force capacity. A power steering system with a reaction force apparatus of this type is mounted in a small space such as a space under an engine room of the vehicle. Therefore, the hydraulic reaction force apparatus must be made compact.

A conventional compact hydraulic reaction force apparatus is described in U.S. Pat. No. 4,034,825, July 12, 1977. An engaging element such as a reaction force plunger and a ball is held on the output shaft side to be movable toward the center of the shaft, and a hydraulic reaction force is applied from the outside of the engaging member. The engaging member is engaged in an engaging recess formed on the input shaft side, thereby generating a restriction force.

In such a conventional structure, if the engaging member is a plunger, the distal end of the plunger is in slidable contact with the engaging recess. When a hydraulic reaction force is generated, a sliding resistance therebetween is increased. A frictional force is increased, and operational stability of the apparatus cannot be assured. When the pressure-receiving surface of the plunger is increased, the radial size of the reaction force apparatus is undesirably increased. The apparatus cannot be made compact, and the plunger diameter is undesirably increased. The guide length becomes insufficient, and it is difficult to obtain a stable operating condition.

When the engaging member is a ball, it is difficult to obtain perfect oil-tightness between the ball and the guide hole therefore. A hydraulic reaction force leaks considerably, and the pressure-receiving surface of the ball is small. In order to obtain an effective hydraulic reaction force, a hydraulic source having a large flow rate is required, thus resulting in impractical applications. Strong demand therefore has arisen for developing a hydraulic reaction force apparatus which is free from the conventional problems, i.e., which is compact and has operation stability.

SUMMARY OF THE INVENTION

It is, therefore, a principal object of the present invention to provide a compact hydraulic reaction force apparatus which can provide stable operation performance.

In order to achieve the above object of the present invention, there is provided a hydraulic reaction force apparatus for a power steering system, comprising a plurality of balls axially slidable in guide holes formed through a flange on one of input and output shafts, a reaction force receiving portion having recesses for respectively engaging with the plurality of balls and formed on the other one of the input and output shafts so as to oppose the flange, and one reaction force piston disposed in a hydraulic reaction force chamber formed in an outer surface of the one of the shafts on the side of the other side surface of the flange opposite to the surface opposing the reaction force receiving portion, the reaction force piston being slidably held on the one shaft to urge each ball in the corresponding engaging recess, thereby causing a restriction force corresponding to the reaction force oil pressure to act between the input and output shafts. The reaction piston is fitted in an annular space between the outer surface of the one shaft and the inner surface of the outer member with a clearance. Seal rings are respectively fitted on the inner and outer surfaces of the reaction force piston, respectively, thereby slidably supporting the piston with oil-tightness.

According to the present invention, when a relative angular displacement occurs between the input and output shafts upon a steering operation, the annular reaction force piston is axially moved by a reaction force oil pressure in accordance with various vehicle travel conditions. The piston abuts against the plurality of balls held on one of the input and output shafts at the end of the piston and urges the balls in its axial direction. The balls are then engaged with the recesses formed in the reaction force receiving portion on the other one of the input and output shafts, thereby generating a predetermined restriction force. In this case, even if each ball contact surface is deviated from the accurate position in the axial direction, the reaction piston can be inclined about the seal rings formed on its inner and outer surfaces. Therefore, the surface of the reaction piston can be uniformly brought into contact with all balls, thereby achieving a stable operation.

DETAILED DESCRIPTION OF THE PREFERRED EMBODIMENT

The present invention will be described in detail with reference to the accompanying drawings.

FIGS. 1 to 4 show a hydraulic reaction force apparatus for a power steering system according to an embodiment of the present invention. Referring to FIGS. 1 to 4, the schematic structure of a power steering unit in the power steering system will be briefly described with reference to FIG. 1. Reference numeral 10 denotes an input shaft (stub shaft) connected to a steering wheel (not shown); 11, an output shaft (pinion shaft) connected to the left end side of the input shaft 10 through a torsion bar 12 and meshed with a rack 13 constituting a steering link mechanism (not shown). The shafts 10 and 11 are properly rotated in a steering direction. A failsafe mechanism interlocked with the shafts 10 and 11 is coupled between the input and output shafts 10 and 11. The failsafe mechanism abuts against the input and output shafts upon rotation of the mechanism through a predetermined angle or more. The failsafe function is effected between a reaction force receiving portion 25 and a projection 21a projecting from a flange 21 to the reaction force receiving portion 25.

Figure 1:
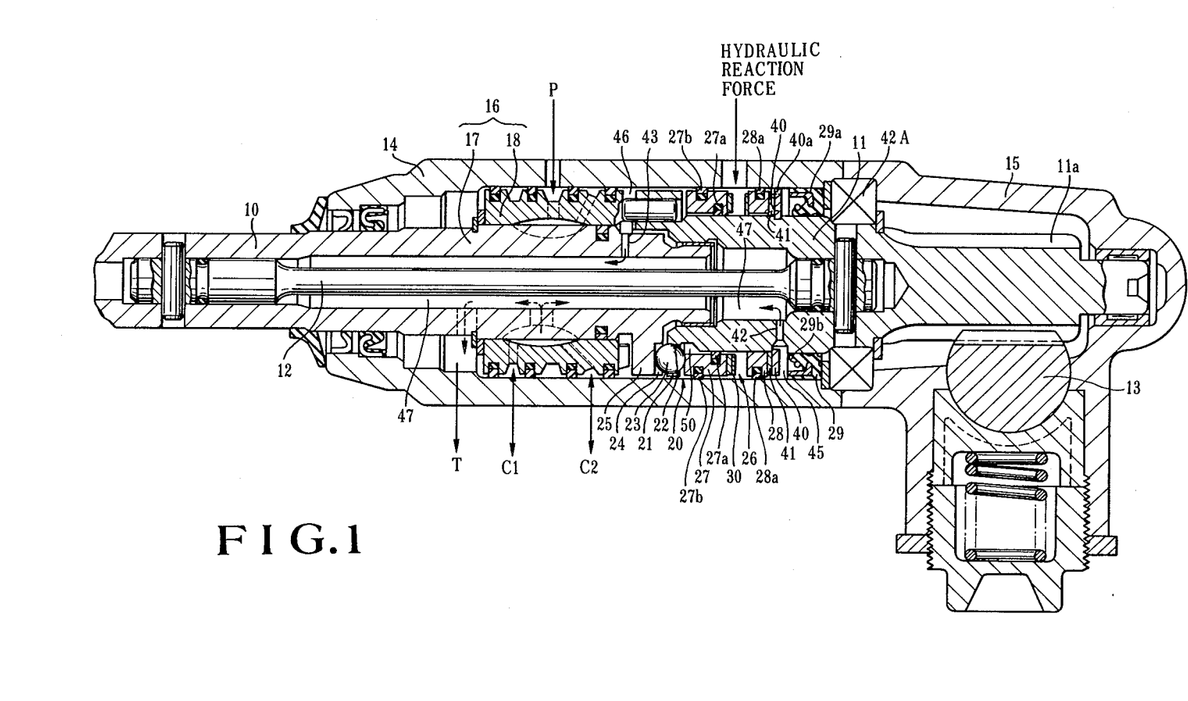
FIG. 1 is a schematic sectional view showing the overall structure of a power steering system according to the present invention.

A rotor 17 and a sleeve 18 which constitute a rotary flow selection valve 16 are integrally formed with the shafts 10 and 11 in bodies 14 and 15 constituting a power steering unit. When the valve 16 is relatively rotated, the flow paths between an oil pump P (not shown), an oil tank T, and the left and right cylinder chambers (C1 and C2) of the power cylinder are switched. The arrangement and operation of such a rotary flow selection valve 16 are known to those skilled in the art, and a detailed description thereof will be omitted.

Figure 2:
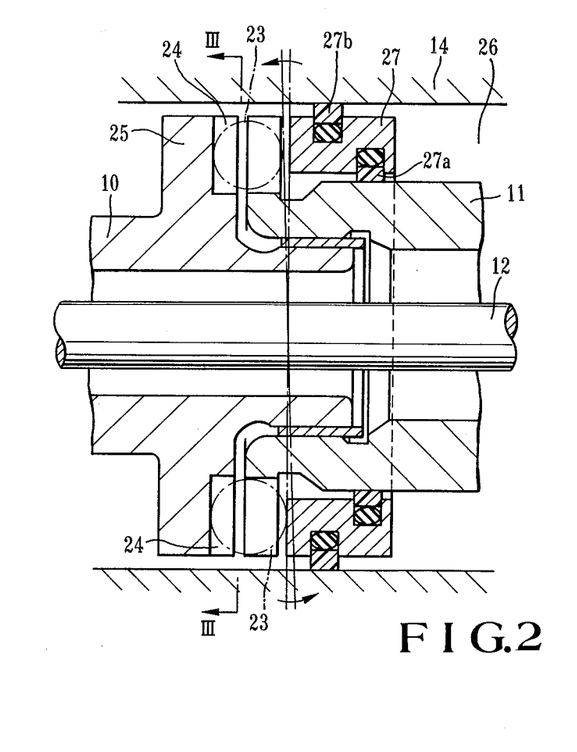
FIG. 2 is an enlarged longitudinal sectional view showing a portion near a reaction piston shown in FIG. 1.
Figure 3:
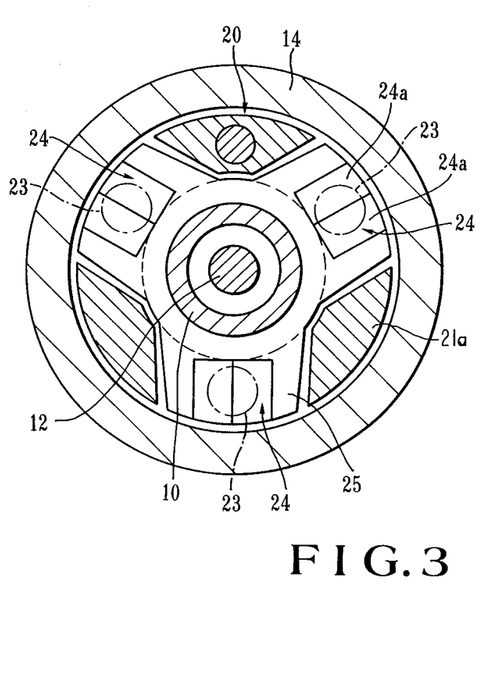
FIG. 3 is a sectional view of the portion of FIG. 3 along the line III—III thereof.
Figures 4, 5A, 5B, 6A, 6B:
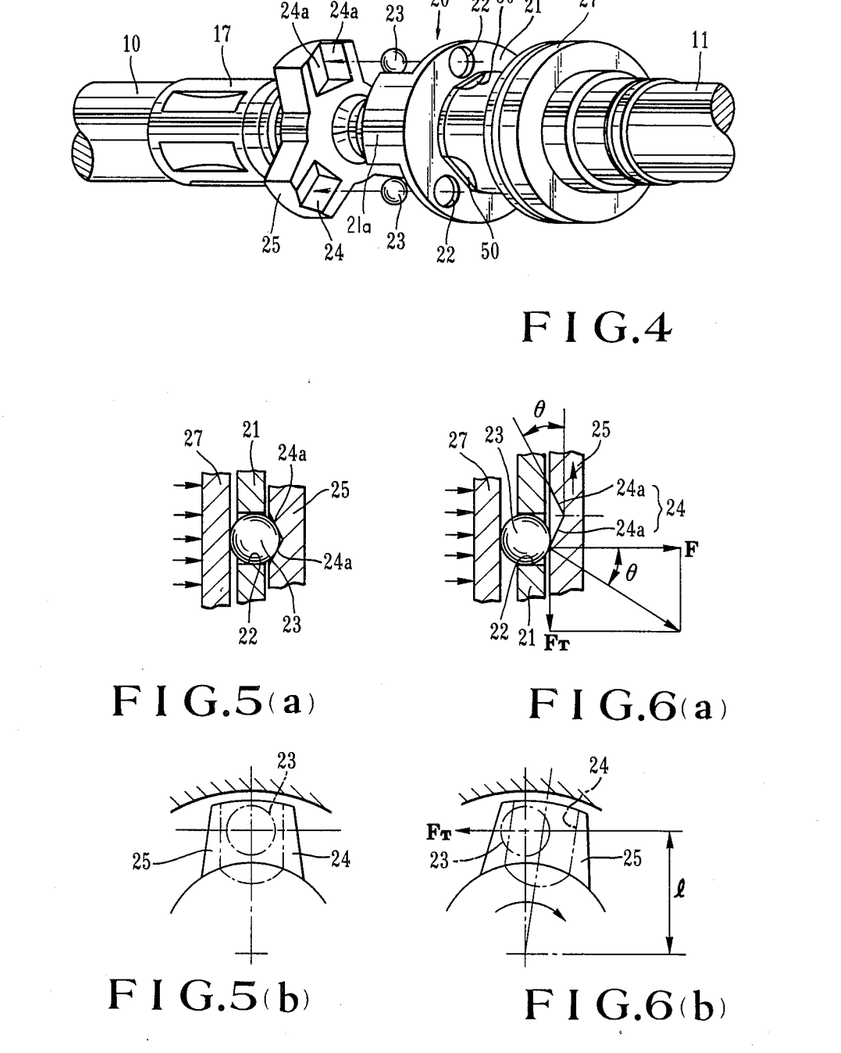
FIG. 4 is an exploded perspective view showing the main part of FIG. 1.
FIGS. 5(a) and 5(b) and 6(a) and 6(b) are views for explaining an engaging state of the balls in the reaction force receiving portion.

Reference numeral 20 denotes a hydraulic reaction force apparatus disposed between the input and output shafts 10 and 11 which are integrally formed with the rotor 17 and the sleeve 18, which latter two constitute the flow selection valve 16. As is best illustrated in FIGS. 2 to 4, the hydraulic reaction force apparatus 20 comprises: three guide holes 22 axially extending in the flange 21 of the output shaft 11 at equal intervals; three balls 23 slidable in the three guide holes 22 along only the axial direction, respectively; the reaction force receiving portion 25 which has three engaging recesses 24 each having inclined side surfaces 24a engaged with a corresponding one of the balls 23 on both sides of the rotational direction and arranged on the input shaft 10 to oppose one side surface of the flange 21; a hydraulic reaction force chamber 26 formed on the outer surface of the output shaft 11 on the side of the other side surface of the flange 21; and one annular reaction force piston 27 slidably disposed in the hydraulic reaction force chamber 26 to be coaxial with the input and output shafts 10 and 11 so as to generate a restriction force corresponding to the reaction force oil pressure between the input and output shafts 10 and 11 upon engagement of the balls 23 in the corresponding recesses 24 of the reaction force receiving portion 25.

Reference numeral 28 denotes a seal member fitted on the outer surface of the output shaft 11 with an oil-tight clearance to seal the other end of the hydraulic reaction force chamber 26. A seal ring 28a is mounted on the outer surface of the seal member 28 to provide a seal between the chamber 26 and the body 14. Reference numeral 30 denotes a corrugated ring spring serving as a set spring, disposed in the hydraulic reaction force chamber 26, for always biasing the reaction force piston 27 to prevent unnecessary movement of the balls 23.

A stop ring 40 consisting of an oil seal removal collared ring is engaged in an annular groove 11d formed on the outer surface of the output shaft 11. This ring 40 stops movement of the seal member 28 in the axial direction. An oil seal 29 is disposed at the removal end portion from the steering body 14 of the output shaft 11 which is spaced apart therefrom by a predetermined distance so as to form a return path to the tank outside the stop ring 40. Outside the oil seal 29, a bearing 42A is mounted to rotatably support the output shaft 11. A steering body 15 is coupled to the outer portion of the bearing 42A.

In this embodiment, reaction force leakage spaces consisting of an outer space 45 of the output shaft 11 disposed in tandem with the hydraulic reaction force chamber 26 through the seal member 28, and a space 46 formed in the coupling portion between the input and output shafts 10 and 11 at a position where the reaction force receiving portion 25 and the flange 21 face, are connected to a return path 47 extending from the flow selection valve 16 to the tank T in the input and output shafts 10 and 11 upon formation of orifice paths 42 and 43 on the outer surfaces of the shafts 10 and 11.

In this embodiment, inner end portions of the guide holes 22 for guiding the balls 23 urged against the reaction force receiving portion 25 on the input shaft 10 side can be shifted by the reaction force piston 27 to the center with respect to the outer portion of the shaft 11 for supporting the reaction force piston 27 on the flange 21 on the output shaft 11 side. Relief grooves 50 which communicate with the guide holes 22 to allow insertion/removal of the balls 23 into/from the guide holes 22 are formed at a portion near the flange 21 on the output shaft 11 for supporting the reaction force piston 27. These relief grooves are arranged at equal angular intervals and have notches.

Figure 7A:
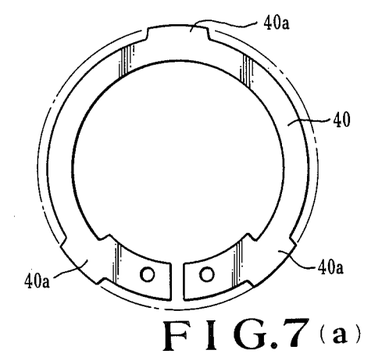
FIGS. 7(a) and 7(b) are a plan view and a sectional view of a stop ring shown in FIG. 1.
Figure 7B:
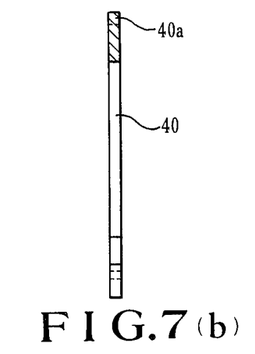
Figure 8A:
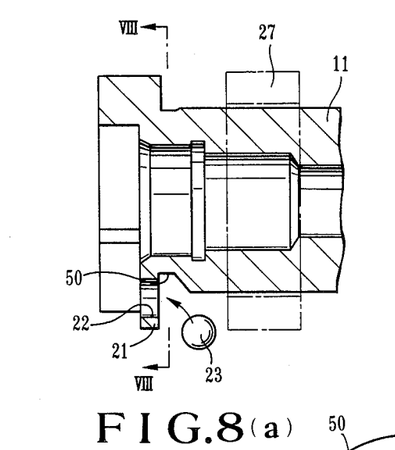
FIGS. 8(a) and 8(b) are views for explaining an operation for mounting balls 23 in a flange 21 of an output shaft 11.
Figure 8B:
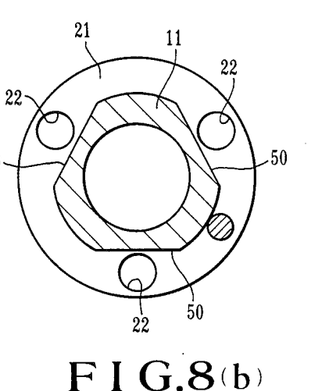

In this embodiment, as is apparent from FIGS. 1, 7(a), and 7(b), an oil seal removal collar 40a is integrally formed with part of an outer edge of the stop ring 40 for preventing movement (toward the oil seal) of the member (seal member 28) located near the oil seal 29 on the outer surface of the output shaft 11. The oil seal removal collar 40a extends to at least a position opposite to a metal ring reinforcing portion 29a of the outer surface of the oil seal 29.

With the above structure, the right end of the annular reaction force piston 27 axially moved in the body 14 serves as a pressure-receiving surface for receiving the hydraulic reaction force in the hydraulic reaction force chamber 26. The pressure-receiving area in a minimum space in the radial direction can be increased as compared with the conventional case. Therefore, a compact arrangement can be achieved at a portion to which the hydraulic reaction force apparatus 20 is attached. In addition, a hydraulic source for obtaining a relatively predetermined hydraulic reaction force can be advantageously made compact.

In this embodiment, the three balls 23 for transmitting the axial thrust of the reation force piston 27 to the reaction force receiving portion 25 of the input shaft 10 are arranged at equal angular intervals (120°) with respect to the flange 21 of the output shaft 11. The contact points of the balls 23 with the reaction force piston 27 are always provided on a single plane. The end portion of the reaction force piston 27 can be uniformly brought into surface contact with the three balls 23. The hydraulic reaction force can act on the reaction force receiving portion 25 through the balls 23. In particular, the diameters of the balls 23 are slightly different from each other due to machining errors. The engaging recesses 24 which engage with the balls 23 have similar machining errors. Therefore, axial positioning errors of the balls 23 on the reaction force piston 27 often occur. According to the present invention, however, the end portion of the reaction force piston 27 is in contact with three points of the three balls 23, thus obtaining the same effect as the surface contact. Therefore, the hydraulic reaction force from the reaction force piston 27 can be accurately transmitted to the reaction force receiving portion 25, thus providing great advantages. Assume that four balls and four engaging recesses are used. If one of the balls is small, the thrust from the reaction force piston cannot be uniformly transmitted, thus requiring high-precision machining of the members. Therefore, the above-mentioned advantage can be easily understood as compared with the four-ball support mechanism.

With the above arrangement, when the thrust from the reaction force piston 27 is transmitted to the reaction force receiving portion 25 through the balls 23, the force can be uniformly transmitted in the circumferential direction of the end face of the reaction force receiving portion 25. An unnecessary bending force and the like do not act on the input and output shafts. Therefore, variations in steering force, and damage to the bushing can be prevented. The hydraulic reaction force apparatus provides excellent performance. High-precision machining of the balls 23, the guide holes 22 for holding the balls, and the engaging recesses 24 of the reaction force receiving portion 25 is not required, as can be apparent from the above description.

According to this embodiment, the left end of the reaction force piston 27 axially moved in the right direction by the reaction force oil pressure supplied in accordance with the various travel conditions such as a vehicle speed urges the balls 23 fitted in the guide holes 22 in the output shaft 11. The balls 23 are respectively axially engaged in the engaging recesses 24 of the reaction force receiving portion 25 of the input shaft 10, thereby obtaining a predetermined restriction force by the hydraulic reaction force. A necessary steering reaction force can be obtained to optimally control the steering force. During steering, when the input shaft 10 is rotated, as is apparent from FIGS. 5(a) and 5(b) and FIGS. 6(a) and 6(b), each ball 23 rides on one of the included surfaces 24a of the corresponding engaging recess 24 and is axially moved by an inclination angle. In this case, a reaction force generated upon urging against the reaction force piston 27 is transmitted to the input shaft 10 as a steering reaction force. FIGS. 5(a) and 5(b) show a case during vehicle straight travel, while FIGS. 6(a) and 6(b) show a case during steering. In these figures, reference symbol F denotes a thrust from the reaction force piston 27; $\theta$, an inclination angle of the engaging recess 24; and l, a length from the axis to the contact position of the ball 23. A hydraulic reaction force, i.e., reaction force torque $T = F_T \times l$ is obtained from a partial force $F_T(F \tan \theta)$ generated between the input and output shafts 10 and 11.

In this case, with the above structure, the balls 23 are brought into rolling contact with the guide holes 22, the inclined surfaces 24a of the engaging recesses 24, and the end face of the piston 27. Therefore, a sliding resistance is small and a frictional distance is small. An increase in sliding resistance in the rotational direction, which poses a problem upon attachment of a seal ring, can be cancelled. Therefore, smooth and appropriate operations of the flow selection valve 16 and the steering wheel can be advantageously obtained.

According to this embodiment, the reaction force piston 27 is loosely fitted with a predetermined clearance in the annular space (i.e., the hydraulic reaction force chamber 26) defined between the outer surface of the output shaft 11 and the inner surface of the body 14. A pair of seal rings 27a and 27b (a double structure of an O-ring and a Teflon ring in this embodiment) are fitted in the inner and outer surfaces, thereby assuring a seal at the left end of the hydraulic reaction chamber 26. In this state, the output shaft 11 can be axially slidably supported.

With this arrangement, as is apparent from FIG. 2, the balls 23 to be engaged with the engaging recesses 24 of the reaction force receiving portion 25 are brought into contact with the reaction force piston 27 such that the piston 27 can absorb the axial positional errors of the balls. That is, the end face of the piston can be inclined (floating) and in contact with three points of the three balls as if the end face is in surface contact with the balls. With this arrangement, the reaction force piston 27 is inclined and supported on the output shaft 11. If the diameters of the balls 23 and the machining of the engaging recesses 24 have errors and the contact points with the balls are inclined with respect to a plane perpendicular to the axis, the end face of the reaction force piston 27 can be displaced, so that the uniform contact state of the reaction force piston 27 on the balls 23 can be assured. As a result, the operating state of the reaction force piston 27 can be stabilized. In addition, with the above arrangement, a seal structure consisting of the simple seal rings 27a and 27b assures a seal on the inner and outer surfaces of the reaction force piston. At the same time, high-precision machining of the reaction force piston 27 and the like is not required, thus obtaining machining advantages.

The clearance at the inner surface of the reaction force piston 27 is set to be smaller than that at its outer surface, so that a slight inclination of the reaction piston 27 is allowed during sliding movement on the output shaft 11. In addition, when the reaction piston 27 is inclined, it should not interfere with the body 14. The seal rings 27a and 27b fitted in the inner and outer surfaces of the reaction force piston 27 must have a predetermined seal margin to assure a seal when the reaction force piston 27 is inclined. The inner seal ring 27a has a center adjusting function on the output shaft 11. In this embodiment, the seal rings 27a and 27b formed on the inner and outer surfaces of the reaction force piston 27 are axially deviated from each other. However, in order to prevent an increase in axial size, proper modifications may be made.

The present invention is not limited to the particular embodiment described above. The shapes, structures and the like of the respective members of the apparatus may be changed and modified as needed to obtain various modifications. In the above embodiment, the balls 23 are arranged on the output shaft 11, while the reaction force receiving portion 25 having the engaging recesses 24 is arranged on the input shaft 10. However, the present invention is not limited to this arrangement. The arrangements of the input and output shafts 10 and 11 may be reversed.

In the hydraulic reaction force apparatus for the power steering system according to the present invention as has been described above, the plurality of balls as are axially slidably fitted in the guide holes formed through the flange formed on one of the input and output shafts. The reaction force receiving portion having the engaging recesses for engaging with the balls is formed on the other of the input and output shafts so as to oppose one side surface of the flange. The reaction piston is disposed in the hydraulic reaction force chamber formed on the other side surface of the flange so as to be coaxial with the input and output shafts so as to urge each ball in a corresponding engaging recess, thereby generating a restriction force corresponding to the reaction force oil pressure between the input and output shafts. This operation is performed by the annular reaction force piston coupled between the input and output shafts. The reaction force piston can be slidably supported by the seal rings formed on its inner and outer surfaces thereof so as to be inclined. Therefore, with a simple arrangement at low cost, the reaction force receiving portion having the engaging recesses and the reaction force piston having a large pressure-receiving area can be arranged in a limited space. Therefore, a compact apparatus having a small radial size and having a large reaction force torque with a small reaction force oil pressure can be provided. Therefore, a separate compact pump can be used as a reaction force source. In addition, rolling contact of the balls with the reaction force piston allows smooth operation. According to the present invention, the end face of the reaction force piston with clearances on its inner and outer surfaces is slidably supported by the inner and outer seal rings while the piston can be inclined. Therefore, the thrust from the reaction force piston can be uniformly transmitted to the reaction force receiving portion through the balls which are in contact with the end face of the reaction force piston. Therefore, a stable reaction force torque can be obtained, thus providing a hydraulic reaction force apparatus having excellent performance.

In the above embodiment, the seal ring 28a is used to seal the other end of the hydraulic reaction force chamber 26. However, the seal ring 28a may be omitted, and the oil seal 29 may also serve as the seal ring.

With the arrangement according to this embodiment, in order to perform maintenance or adjustment at the time of assembly of the apparatus, the apparatus can be disassembled in the following manner.

In order to remove a shaft assembly of the input and output shafts 10 and 11 from the bodies 14 and 15, the body 15 is removed from the body 14, and the shaft assembly is removed from the pinion side. When the shaft (the shaft assembly consisting of the input and output shafts 10 and 11 and their accessories) is removed from the body 14, the oil seal 29 disposed near (i.e., the joint portion with the body 15) the shaft removal end of the body 14 can be appropriately and accurately removed in the following manner, unlike in the conventional case wherein a main lip portion 29b is damaged. The oil seal removal collar 40a integrally extending from the edge of the stop ring 40 removed together with the shaft 11 abuts against the annular metal reinforcing portion 29a of the oil seal 29.

The conventional case presents a problem caused by damage to the stop ring 40 of the oil seal 29 arranged at the removal end of the body 14. However, according to the arrangement of this embodiment, the conventional problem can be solved. As is apparent from FIGS. 7(a) and 7(b), the three collars 40a extend from the edge of the stop ring 40. However, the present invention is not limited to this. The number of collars is not limited to three if the function of the ring 40 as a stop ring is not interfered, and various modifications may be made.

According to this embodiment, the reaction force oil pressure leakage spaces consisting of the outer space 45 of the output shaft 11 arranged in tandem with the hydraulic reaction force chamber 26 through the seal member 28 and the outer space 46 defined by the coupling portion between the input and output shafts 10 and 11 are connected to the return path 47 from the flow selection valve 16 to the tank T formed in the input and output shafts 10 and 11 upon formation of the orifice paths 42 and 43 on the outer surfaces of the shafts 11 and 10.

In the hydraulic reaction force apparatus 20, leakage of the reaction force oil pressure from the hydraulic reaction force chamber 26 inevitably occurs in the space 45 at the other end of the seal member 28 for partitioning the hydraulic reaction force chamber 26 and the space 46 formed at the front end of the reaction force piston 27 which abuts against the balls 23. In a conventional arrangement, the spaces 45 and 46 are connected to the return path 47 in the flow selection valve 16 formed in the input and output shafts 10 and 11 in the power steering system. A problem posed by such a hydraulic connection is a surge pressure generated in the return path 47 by a kickback or the like during vehicle travel. More specifically, when the spaces 45 and 46 are simply connected to the return path 47, the surge pressure is generated even in the spaces 45 and 46. In addition, since the spaces 45 and 46 communicate with the hydraulic reaction force chamber 26 and the reaction force piston 27, the surge pressure interferes with the operation of the reaction force piston 27 and acts as an impact pressure to cause impact noise or the like. Therefore, the surge pressure is the very important problem for assuring the proper operation of the hydraulic reaction force apparatus 20.

According to the embodiment of the present invention, in order to connect the leakage path spaces 45 and 46 and the return path 47, the diameter of the path is reduced, or a choke having an aperture is disposed in the path. Therefore, the connecting holes of the spaces 45 and 46 serve as orifice paths 42 and 43, respectively. In the orifice paths 42 and 43, even if a surge pressure caused by kickback is generated in the return path 47, the reduced pressure is transmitted to the spaces 45 and 46. Unlike the conventional apparatus, movement of the reaction force piston 27 is not interfered or impact noise is not generated according to a simple structure with accuracy, as is apparent from the above description.

According to the embodiment described above, the three balls are arranged at equal angular intervals on the flange formed on one of the input and output shafts and are axially slidably fitted in the guide holes, and the reaction force receiving portion having the three engaging recesses which respectively engage with the balls is formed on the other one of the input and output shafts to oppose one side surface of the flange. One reaction force piston is slidably fitted in the hydraulic reaction force chamber formed on the other side surface of the flange to be coaxial with the input and output shafts. The reaction force piston urges the balls so as to engage them with the engaging recesses and to apply a restriction force corresponding to the reaction force oil pressure between the input and output shafts. With a simple, inexpensive arrangement, the reaction force receiving portion having the balls and the engaging recesses and the reaction force piston having a large pressure-receiving area are properly fitted in the limited space. The radial size of the apparatus can be reduced and a large reaction force torque can be obtained with a small reaction force oil pressure. It is also possible to use a separate compact pump as a reaction force oil pressure source, and rolling contact of the balls allows the smooth operation, thus providing many practical advantages. According to this embodiment, the end face of the reaction force piston is brought into contact with the three balls at three points on a single plane, so that the thrust from the reaction force piston can be uniformly transmitted to the reaction force receiving portion through the balls. Therefore, a stable reaction force torque can be properly obtained, and an excellent hydraulic reaction force apparatus can be obtained.

According to this embodiment, the guide holes 22 for holding the balls 23 are deviated toward the axis of the flange 21. The outer dimensions of the flange 21 can be reduced, and the reaction force 27 has the mating outer dimensions, so that the diameter of the reaction force piston can be almost equal to the outer diameter of the sleeve 18 of the rotary flow selection valve 16 disposed on the input and output shafts to be adjacent to the piston 27. The radial size of the hydraulic reaction force apparatus can be reduced. In addition to compactness of the apparatus, the guide length along the axial direction of the reaction force piston 27 can be sufficiently assured. Therefore, unlike the conventional apparatus, the reaction force piston 27 is not operated with inclination or the inner surface portion of the piston 27 is not brought into contact with the corresponding shaft. Stable and proper sliding of the reaction force piston can be obtained, thereby stabilizing the operation of the apparatus because the guide length of the reaction force piston 27 along the axial direction is assured at a portion where the relief grooves 50 are not formed on the outer surface of the output shaft 11. Due to the presence of the relief grooves 50, the balls 23 can be easily and properly inserted into or removed from the guide holes 22 on the side of the reaction force piston 27 although the diameter of the reaction force piston 27 is reduced.

Figure 9:
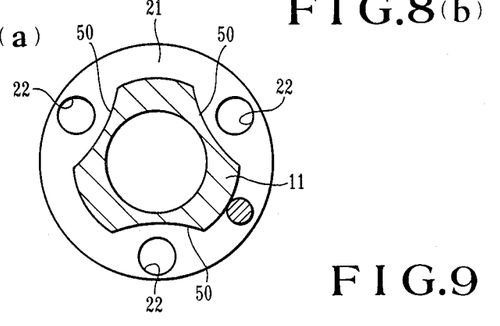
FIG. 9 is a view showing a modification corresponding to the arrangement of FIG. 8(b).

In the above embodiment, the relief grooves 50 of the balls 23 are notches formed on part of the cylindrical body. However, the relief grooves 50 are not limited to this arrangement. For example, as shown in FIG. 9, each relief groove can have an arcuate bottom surface.

What is claimed is:

1. A hydraulic reaction force apparatus for a power steering system, comprising:
   a body;
   input and output shafts accommodated in said body, each shaft having an outer surface;
   a flange formed on one of said input and output shafts and having a plurality of axially extending guide holes;
   a plurality of balls movably fitted in said guide holes, respectively;
   a reaction force receiving portion, formed on the other one of said input and output shafts, for axially receiving said balls;
   a hydraulic reaction force chamber formed at a position opposite to said reaction force receiving portion with respect to said flange;
   an annular reaction force piston, movably and coaxially fitted on said output shaft with a clearance, for urging said balls against said reaction force receiving portion to generate a restriction force corresponding to a reaction force oil pressure, the restriction force acting between said input and output shafts; and
   a plurality of seal rings one of said seal rings being disposed between said reaction force piston and said body and another of said seal rings being disposed between said reaction force piston and said one of said input and output shafts.

2. An apparatus according to claim 1, wherein said flange is formed on said output shaft, said reaction force receiving portion is formed on said input shaft, and said reaction force piston is fitted on the outer surface of said output shaft.

3. An apparatus according to claim 2, wherein said reaction force receiving portion comprises radial engaging recesses.

4. An apparatus according to claim 1, wherein said guide holes are formed in said flange at positions closer to an axis of said one of said input and output shafts than a periphery of said one of said input and output shafts, said periphery excluding said flange.

5. An apparatus according to claim 4, wherein a side wall adjacent to said guide holes has notches as relief grooves so as to allow easy insertion or removal of said balls.

6. An apparatus according to claim 1, wherein said plurality of balls comprises three balls, and wherein said reaction force receiving portion and said guide holes comprise three engaging recesses and three guide holes arranged at equal angular intervals on the outer surface of said other one of said input and output shafts and said flange, respectively.

7. An apparatus according to claim 6, wherein said flange includes a failsafe projection means for abutting against said reaction force receiving portion to interlock said input and output shafts when said input and output shafts are pivoted through an angle exceeding a predetermined angle.

8. An apparatus according to claim 1, further comprising:
a stop ring, fitted on the outer surface of one of said input and output shafts, for stopping axial movement of a slidable member; and
an oil seal member fitted on the outer surface of said one of said input and output shafts on the other side of said stop ring from said slidable member, said oil seal member being provided with an annular metal reinforcing portion, one end of said annular metal reinforcing portion facing said stop ring, and
said stop ring being provided with a radially extending collar portion for facilitating removal of said oil seal member.

9. An apparatus according to claim 1, wherein an outer surface space formed in said hydraulic reaction force chamber through a seal member and an outer surface space defined by said reaction force receiving portion and said flange which holds said balls are connected to tank return paths through orifices, said return paths being formed in said input and output shafts, respectively.

* * * * *